March 18, 1952  R. K. PETRY  2,590,032
LAMINATED COVERING AND
PROCESS OF MAKING SAME
Filed March 4, 1947
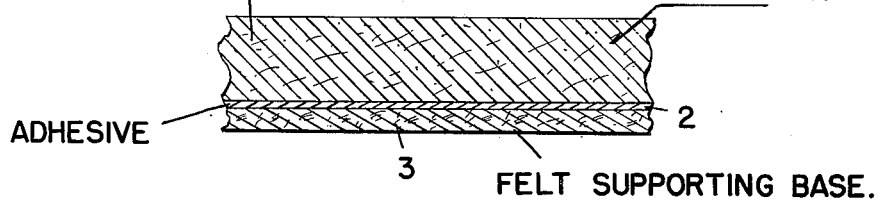
FIG. 1 — PLASTICIZED THERMOPLASTIC ELASTOMERIC POLYMER WITH HIGH FILLER CONTENT.
ADHESIVE
FELT SUPPORTING BASE.
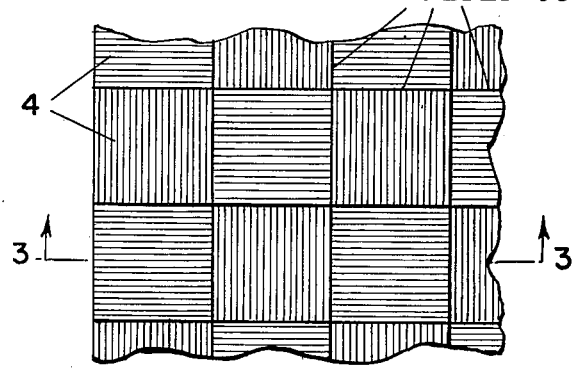
FIG. 2 WELDED JOINTS.
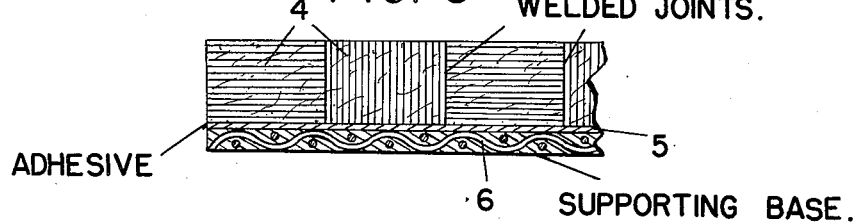
FIG. 3 WELDED JOINTS.
ADHESIVE
SUPPORTING BASE.
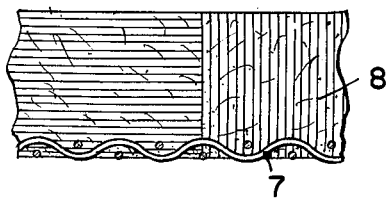
FIG. 4
Inventor
ROBERT K. PETRY,
By Stone, Boyden & Mack.
Attorneys.

Patented Mar. 18, 1952

2,590,032

UNITED STATES PATENT OFFICE 2,590,032

LAMINATED COVERING AND PROCESS OF MAKING SAME

Robert K. Petry, Wilmington, Del., assignor, by mesne assignments, to Congoleum-Nairn Inc., Kearny, N. J., a corporation of New York Application March 4, 1947, Serial No. 732,208

4 Claims. (Cl. 154—26)

This invention relates to improvements in laminated floor and wall coverings and to processes of manufacturing the same.

One of the chief problems in the production of laminated sheet material for floor and wall coverings is to provide a wear or decorative surface layer which will satisfactorily adhere to a supporting base and which, when in use and during handling and storage, will remain attached to said base and will not cause curling of the edges. Also it has been a problem to reduce the time generally required in producing floor and wall coverings made by laminating a wear surface layer with a supporting base. Ordinarily, long manufacturing cycles are required and include weeks of curing in some instances.

Laminated products in which a wear surface layer or film must undergo a chemical change, such as oxidation or polymerization by stoving or vulcanization by the action of certain chemical reagents and catalysts or accelerators, will not produce as uniform a wear surface as is possible in the process of the present invention. The chemical changes involved do not always occur at a uniform rate or to the same extent throughout the thickness of the wear surface layer. Furthermore these changes usually continue to progress, though at a slower rate, even after the wear surface is cured to the desired state. Thus many products deteriorate upon ageing. Some products lose their flexibility, elasticity and resilience because of continued hardening and oxidation. Curling of edge portions in a sheet product is a common resultant characteristic of uneven curing. If the curing cycle is not carried far enough during production, the finished products are soft and otherwise unsatisfactory.

An object of the present invention is to provide improved flexible laminated floor and wall coverings including a pliable, thermoplastic, elastomeric, synthetic resin wear or decorative surface layer and a supporting base in which the bond between the said layer and base is substantially permanent and is maintainable to a high degree under varying conditions of use and handling.

Another object is to provide improved flexible laminated floor and wall coverings including a pliable thermoplastic, elastomeric, synthetic resin wear or decorative surface layer having a high filler content, and that is substantially free from self-distorting influences and remains substantially permanently attached to a commonly used supporting base material under varying temperature and humidity conditions.

A further object is to provide improved processes of manufacturing laminated floor and wall coverings of the type hereinafter described and claimed.

Other objects and advantages will be clear from the following description.

For the product of the present invention a wear or decorative surface layer is provided which has uniform characteristics dependent upon the characteristics of the supporting base, such as those used in the art, as for instance, asphalt saturated flooring felt, burlap, cotton duck, and others. Such base materials or goods tend to expand and contract with changes in temperature and humidity. In the laminated product of this invention, the elasticity and resilience of the wear or decorative surface layer permits it to stretch and recoil to the extent that the said surface layer will undergo changes in dimensions that will substantially coextend with the dimensional changes of the supporting base material, without danger of blistering or peeling therefrom and without curling of edges.

A polyvinyl film with a properly proportioned filler content, preferably in the range set forth hereinbelow, more firmly adheres to a flexible base, when employing any of a wide range of adhesives or when a fabric base and the filled polyvinyl film are simply pressed together while heated. The more expensive and very special adhesives otherwise resorted to and which do not consistently assure a firm bond with lower filler content, are not found necessary. Adhesives that are ordinarily not considered suitable for vinyl films are satisfactorily and highly effectively employed, as for instance, the less expensive adhesives such as bituminous adhesives, which are economical, more readily available, and easy to apply.

A high filler content in a vinyl film attached to a flexible base limits the expansion or stretching of the film and thereby also aids in resisting delamination and curling. If the wear or decorative surface film or layer is too elastic, the bond between the film and the base can be too easily broken by impact or pressure or other means.

To provide a wear or decorative surface layer particularly adaptable to the specific uses described, a thermoplastic, elastomeric polymer is plasticized, and mixed with sufficiently high proportions of filler material to provide a desired elasticity and resilience, and yet retain pliability, flexibility, toughness, hardness, and a high degree of wear resistance.

The thermoplastic, elastomeric polymers employed in the present invention are preferably vinyl polymers in the high viscosity range. Preferred among the latter are the polymers of vinyl chloride, vinyl acetate, vinyl butyral, and co-polymer of vinyl chloride and vinyl acetate. A copolymer which has proven satisfactory is one prepared from 93 to 95 per cent vinyl chloride and the balance vinyl acetate, with an average molecular weight of approximately 24,000 as determined by the Staudinger method, and having a specific gravity of about 1.34 to 1.37, and softening at approximately 150° F. These above-mentioned polymer materials, when formed for present purposes, require no chemical or other treatment except the addition of a plasticizer.

Plasticizers are employed which are compatible with these polymers, and which contain no constituents that are, as in the case of the polymers, reactive with atmospheric oxygen in the range of atmospheric temperatures. Examples of such plasticizers are tricresyl phosphate, dioctyl phthalate, dicapryl phthalate, dibutyl sebacate, dibutoxy ethyl phthalate, dibutoxyglycol phthalate, polyethyleneglycol di-2-ethylhexoate, triethylene-glycol di-2-ethyl hexoate and the like.

The filler material employed contains preferably both pigment and fiber, though either may be used alone for some purposes. Examples of pigments are asbestine, barytes, calcium carbonate, calcium sulfate, clay, dolomite, mica, silica, slate flour, serpentine, talc. Colored pigments such as chrome green, chrome yellow, carbon black, titanium dioxide and others are used in solid colored or varicolored sheets.

Fibrous fillers include, for example, asbestos, cork, wood flour, cellulose fibers in general, and others, including animal fiber such as leather.

The particle size of the pigment fillers should be such that they will pass through 325 mesh screen. Fibrous fillers such as wood flour should pass through a 50 mesh screen, though finer grades can be used. Asbestos fiber employed is commonly called "shorts" and passes completely through a 10 mesh screen.

Traces of lubricants such as stearic acid, and metallic stearates, and of stabilizers such as basic lead carbonate, basic lead silicate, and basic lead stearate are generally added to the mix.

In preparing the mix, the plasticized polymer material and filler material, with or without, but preferably with, a trace of the lubricant and of the stabilizer, are heated together in a Banbury mixer at a temperature within the approximate range of 300° F. to 350° F. and the filler is thoroughly dispersed in the plastic. No other materials including solvents, diluents and moistening agents need be added. A period of only two or three minutes is required for this mixing.

The mix contains substantially 50% to substantially 75% by weight of filler material. These limits should not vary more than one to five percent. A ratio of pigment filler to fibrous filler that is particularly desirable and advantageous is two parts by weight of pigment to one part by weight of fiber. Preferably not more than fifty percent of fiber is used in the mixed filler, thoroughly and uniformly distributed.

Expressed in parts by weight, a mix for preparing a sheet contains from about 16 to about 38 parts of the polymer, about 7 to about 18 parts of the plasticizer, and about 50 to about 75 parts of filler. Optimum proportions are about 23 parts of polymer, about 12 parts of plasticizer, and about 65 parts of filler. A compounded sheet containing the various pigments and fillers in the proportions stated has a preferred specific gravity of 1.85 to 1.90. Depending on the types of fillers and to some extent the proportion thereof, the specific gravity may be as low as 1.5.

Examples of complete preferred formulae of mixes are as follows:

*Example 1*

| | Parts by weight |
|---|---|
| Co-polymer of vinyl chloride and vinyl acetate | 351 |
| Tri cresyl phosphate | 140 |
| Asbestos fiber | 125 |
| Wood flour | 30 |
| Dry ground limestone | 320 |
| Stearic acid | 2 |
| Basic lead carbonate | 7 |
| Chrome green | 25 |

This formula represents 50% filler content.

*Example 2*

| | Parts by weight |
|---|---|
| Co-polymer of vinyl chloride and vinyl acetate | 316 |
| Di octyl phthalate | 126 |
| Asbestos fiber | 140 |
| Wood flour | 30 |
| Dry ground limestone | 100 |
| Silica flour | 215 |
| Stearic acid | 2 |
| Basic lead silicate | 6 |
| Titanium dioxide | 50 |
| Chrome green | 15 |

This formula represents 55% filler content.

*Example 3*

| | Parts by weight |
|---|---|
| Co-polymer of vinyl chloride and vinyl acetate | 243 |
| Tri cresyl phosphate | 131 |
| Asbestos fiber | 155 |
| Wood flour | 40 |
| Silica flour | 325 |
| Stearic acid | 1 |
| Basic lead carbonate | 5 |
| Titanium dioxide | 100 |

This formula represents 62% filler content.

*Example 4*

| | Parts by weight |
|---|---|
| Co-polymer of vinyl chloride and vinyl acetate | 236 |
| Di octyl phthalate | 54 |
| Tri cresyl phosphate | 54 |
| Asbestos fiber | 125 |
| Wood flour | 80 |
| Dry ground limestone | 210 |
| Silica flour | 210 |
| Barium stearate | 1 |
| Basic lead silicate | 5 |
| Chrome yellow | 25 |

This formula represents 65% filler content.

*Example 5*

| | Parts by weight |
|---|---|
| Co-polymer of vinyl chloride and vinyl acetate | 176 |
| Di octyl phthalate | 70 |
| Asbestos fiber | 235 |
| Dry ground limestone | 485 |
| Stearic acid | 1 |
| Basic lead carbonate | 3 |
| Carbon black | 30 |

This formula represents 75% filler content.

The mix with properly adjusted filler content is formed into a sheet on heated rolls preferably within the above approximate temperature range, and when reduced to a desired thickness, for instance, from about 0.010 inch to about 0.125 inch or thicker, and cooled on cooling rolls or other means, the sheet is immediately attached by means of an adhesive to a selected supporting base. When an adhesive is not to be used, the sheeted mix may be taken from the heated sheeting rolls and bonded to a fabric base by heat and pressure. The laminated product is thereafter wound into rolls and packaged.

A bituminous adhesive is preferably employed as the adhesive for bonding the laminations. Asphalt having a melting point of about 180° F. to about 200° F. admixed with 25% to 33% by weight of finely divided filler such as slate flour, calcium carbonate, diatomaceous silica, clay, asbestine, etc., is found satisfactory. From 10% to 25% of such substances as stearine pitch and petroleum polymers may be added to improve the elasticity and adhesiveness of the bonding material. An example of such material is as follows:

|  | Parts by weight |
|---|---|
| Asphalt (M. P. 180° to 200° F.) | 60 |
| Stearine pitch | 15 |
| Slate flour (400 mesh) | 25 |

The film thickness of the bonding layer depends on the relative smoothness of the surfaces being bonded. Any irregularity in the surfaces must be filled in with adhesive. With smooth surfaces only very thin films of adhesive are required.

In the accompanying diagrammatic drawings:

Fig. 1 is an enlarged sectional view through the thickness of a portion of a laminated sheet having a solid colored wear or decorative surface layer;

Fig. 2 is a top view of a portion of a laminated sheet showing a figured decorative surface;

Fig. 3 is an enlarged sectional view of Fig. 2 on line 3—3; and

Fig. 4 is an enlarged sectional view through the thickness of a portion of a modified laminated sheet.

In Fig. 1, a wear or decorative surface layer 1 is shown bonded by an adhesive film 2 to a felt, or matted fiber, supporting base 3 preferably impregnated with a waterproof saturant. The dots, and short, curved lines in the layer 1 represent filler material in the form of pigment and fiber particles respectively, uniformly distributed in the plasticized, thermoplastic, elastomeric polyvinyl binder.

In Figs. 2 and 3 an example of a laminated sheet in which a layer 4 of the filled thermoplastic, elastomeric plasticized polymer, is shown bonded by an adhesive 5 to a base 6 of woven goods. The layer 4 has figured decorations, represented by different colored squares, which extend through the thickness of this layer. In view of the thermoplastic character of the mix for the surface layer, the different colored pieces are preformed and their edges fitted together. By applying heat and pressure to the contiguous edges the pieces become welded together. The finished decorative sheet is continuous and is as strong at the joints as it is in any other portion, and has the desired overall elasticity and resiliency for attachment to a supporting base when loaded to the proper extent as herein directed.

Fig. 4 illustrates an example of a laminated decorative sheet product in which a woven fabric base 7 has its meshes anchored to the filled polyvinyl layer 8 by applying heat and pressure to the said layer and at least partially forcing the material of this layer through said meshes. The fabric base may, if desired, be entirely embedded at the unexposed surface of a sheet. To secure proper bonding in this manner the layer 8 and base 7 may be pressed together by means of rollers or platens at temperatures up to approximately 300° F.

It is seen that in preparing the wear or decorative surface for the laminated sheet of the present invention, no aqueous or volatile solvent dispersing agents or substances, no vulcanizing or oxidizing agents, and no fatty oils are required. The cost and time required for production of the finished product with a hard, compact wear or decorative surface, are substantially reduced, in absence of, and by avoidance of the use of such agents and substances.

Thorough mixing of the filler and plastic constituents of a sheet and calendering thereof forms a layer which is substantially uniform throughout its entire thickness. The desired properties of durability and chemical resistance are obtained and these qualities are permanent, since there is no change in the plastic over infinitely long periods. It resists effectively, deterioration from the effects of light, the atmosphere, and of general exposure.

Besides obtaining greater adhesion, to the base material, of the plastic wear layer with its high filler content and even by means of bituminous adhesives, the elasticity and resilience of the plastic layer can be adjusted by proper addition of filler dependent upon the change of dimensions produced in the supporting base material by temperature changes and by changes in the moisture content thereof, thus increasing resistance to delamination as well as to curling. Because of the resistance to curling, the laminated product does not require cementing to floor surfaces.

Other advantages will be apparent to those skilled in the art to which the present invention relates. The invention as hereinabove set forth is embodied in particular form and manner but may be variously embodied within the scope of the claims hereinafter made.

What is claimed is:

1. In a process of manufacturing flexible, laminated floor and wall coverings having a flexible supporting base and an adherently attached, flexible surface layer; placing edge to edge preformed pieces of different colored pliable sheet material containing from about 50% to about 75% by weight of filler material and binder consisting of a plasticized, synthetic vinyl polymer, to form a pattern, the said polymer being selected from a group consisting of polyvinyl chloride, polyvinyl acetate, polyvinyl butyral, and copolymer of vinyl chloride and vinyl acetate, and the plasticizer in the binder being nonoxidizable by atmospheric oxygen at atmospheric temperatures; applying heat and pressure to said edges to weld the pieces together and form a continuous flexible sheet in which the welded joints are as strong as other portions of said sheet, and bonding the resulting decorative sheet to a fibrous, flexible supporting base, the said filler material and plasticized polymer in the said pieces being proportioned to form a firm bond and also to reduce the elasticity of the said decorative sheet but to retain sufficient resilience and elasticity to resist delamination or curling under varying conditions of use.

2. In flexible, laminated sheet material for floor and wall coverings, a combination of layers that resist delamination and curling consisting of: a decorative surface layer consisting of substantially 16 parts to substantially 38 parts by weight of synthetic vinyl resin, the said resin being selected from a group consisting of polyvinyl chloride, polyvinyl acetate, polyvinyl butyral, and copolymer of vinyl chloride and vinyl acetate; substantially 7 parts to substantially 18 parts by weight of plasticizer non-oxidizable by atmospheric oxygen at atmospheric temperatures, and compatible with said resin, and substantially 50 parts to substantially 75 parts by weight of discrete, finely divided, filler particles; a bitumen saturated fabric base layer, and an intermediate bituminous adhesive layer in direct contact with both the said decorative surface layer and base layer, and for attaching the said decorative surface layer to said base layer, the said decorative surface layer being adapted to change its dimensions coextensively with said base layer on expansion and contraction of the latter layer with changes in temperature and changes in moisture content in the said base layer.

3. In flexible, laminated sheet material for floor and wall coverings, a combination of layers that resist delamination and curling consisting of: a decorative surface layer consisting of substantially about 23 parts by weight of synthetic vinyl resin, the said resin being selected from a group consisting of polyvinyl chloride, polyvinyl acetate, polyvinyl butyral, and copolymer of vinyl chloride and vinyl acetate; about 12 parts by weight of plasticizer non-oxidizable by atmospheric oxygen at atmospheric temperatures and compatible with said resin, and about 65 parts by weight of discrete, finely divided, filler particles; a bitumen saturated fabric base layer, and an intermediate bituminous adhesive layer in direct contact with both the said decorative surface layer and base layer, and for attaching the said decorative surface layer to said base layer, the said decorative surface layer being adapted to change its dimensions co-extensively with said base layer on expansion and contraction of the latter layer with changes in temperature and changes in moisture content in the said base layer.

4. In flexible, laminated sheet material for floor and wall coverings, a combination of layers that resist delamination and curling consisting of: a decorative surface layer consisting of substantially 16 parts to substantially 38 parts by weight of synthetic vinyl resin, the said resin being selected from a group consisting of polyvinyl chloride, polyvinyl acetate, polyvinyl butyral, and copolymer of vinyl chloride and vinyl acetate; substantially 7 parts to substantially 18 parts by weight of plasticizer non-oxidizable by atmospheric oxygen at atmospheric temperatures, and compatible with said resin, and substantially 50 parts to substantially 75 parts by weight of a mixture of discrete, finely divided, pigment and fiber particles, in which mixture the proportion of said fiber particles is not greater than 50 percent; a bitumen saturated fabric base layer, and an intermediate bituminous adhesive layer in direct contact with both the said decorative surface layer and base layer, and for attaching the said decorative surface layer to said base layer, the said decorative surface layer being adapted to change its dimensions coextensively with said base layer on expansion and contraction of the latter layer with changes in temperature and changes in moisture content in the said base layer.

ROBERT K. PETRY.

REFERENCES CITED

The following references are of record in the file of this patent:

UNITED STATES PATENTS

| Number | Name | Date |
| --- | --- | --- |
| 685,520 | Melvin | Oct. 29, 1901 |
| 1,899,416 | Irwin et al. | Feb. 28, 1933 |
| 1,929,453 | Semon | Oct. 10, 1933 |
| 1,966,856 | Groff | July 17, 1934 |
| 1,988,616 | Turkington | Jan. 22, 1935 |
| 2,071,360 | Reid | Feb. 23, 1937 |
| 2,430,934 | Kemmler et al. | Nov. 18, 1947 |
| 2,434,974 | Woerner | Jan. 27, 1948 |

FOREIGN PATENTS

| Number | Country | Date |
| --- | --- | --- |
| 371,812 | Great Britain | Apr. 26, 1932 |
| 668,200 | France | July 8, 1929 |